US012467606B2

(12) United States Patent
Cerce et al.

(10) Patent No.: US 12,467,606 B2
(45) **Date of Patent: *Nov. 11, 2025**

(54) LED BOARD MOUNTING SYSTEM FOR A LIGHT FIXTURE

(71) Applicant: Industrial Lighting Products, LLC, Sanford, FL (US)

(72) Inventors: Dominick Cerce, Sanford, FL (US); Saturnino Oquendo, Jr., Orlando, FL (US)

(73) Assignee: Industrial Lighting Products, LLC, Sanford, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,004

(22) Filed: Jul. 7, 2023

(65) Prior Publication Data

US 2023/0349537 A1 Nov. 2, 2023

Related U.S. Application Data

(63) Continuation of application No. 17/695,408, filed on Mar. 15, 2022, now Pat. No. 11,739,915, which is a continuation of application No. 16/985,907, filed on Aug. 5, 2020, now Pat. No. 11,287,113, which is a continuation of application No. 16/460,550, filed on Jul. 2, 2019, now Pat. No. 10,753,584, which is a continuation of application No. 15/450,633, filed on Mar. 6, 2017, now Pat. No. 10,371,358.

(51) Int. Cl.
*F21V 19/00* (2006.01)
*F21V 23/06* (2006.01)
*F21Y 103/10* (2016.01)
*F21Y 115/10* (2016.01)

(52) U.S. Cl.
CPC ........ *F21V 19/003* (2013.01); *F21V 19/0045* (2013.01); *F21V 23/06* (2013.01); *F21Y 2103/10* (2016.08); *F21Y 2115/10* (2016.08)

(58) Field of Classification Search
CPC ...... F21V 23/06; F04D 29/601; F04D 29/005; F04D 29/4226
See application file for complete search history.

(56) References Cited

U.S. PATENT DOCUMENTS 9,249,956 B1 * 2/2016 Oldani .................... F21V 21/26
11,333,330 B2 * 5/2022 Peet ...................... F21V 19/004
(Continued)

*Primary Examiner* — Zheng Song
(74) *Attorney, Agent, or Firm* — Blank Rome LLP

(57) ABSTRACT

A light board mounting system includes a fixture frame having a planar surface and a plurality of alternating bosses disposed along a length of the fixture frame. The system also includes a light board having a first side and a second side, a plurality of lights disposed along a length of the light board on the first side, and a pair of electrical contacts coupled to the plurality of lights and mounted to the second side of the light board and extending away from the second side. In addition, the light board mounting system includes a first edge and opposing second edge of the light board secured to the planar surface of the fixture frame between the plurality of alternating bosses, the second side of the light board being adjacent to the planar surface of the fixture frame and the pair of electrical contacts extending through the planar surface.

21 Claims, 6 Drawing Sheets

(56) References Cited

U.S. PATENT DOCUMENTS

| | | | | |
|---|---|---|---|---|
| 2008/0316391 | A1* | 12/2008 | Hsiao | G02F 1/133608 362/249.16 |
| 2017/0034941 | A1* | 2/2017 | McCurley | H05K 1/02 |
| 2017/0059139 | A1* | 3/2017 | McCanless | F21V 19/004 |

* cited by examiner

LED BOARD MOUNTING SYSTEM FOR A LIGHT FIXTURE

CROSS REFERENCE TO RELATED APPLICATION

This application is a continuation of U.S. patent application Ser. No. 17/695,408, Filed Mar. 15, 2022, which is a continuation of U.S. patent application Ser. No. 16/985,907, filed Aug. 5, 2020, now U.S. Pat. No. 11,287,113, which issued on Mar. 29, 2022, which is a continuation of U.S. patent application Ser. No. 16/460,550, filed Jul. 2, 2019, now U.S. Pat. No. 10,753,584, which issued on Aug. 25, 2020, which is a continuation of U.S. patent application Ser. No. 15/450,633, filed Mar. 6, 2017, now U.S. Pat. No. 10,371,358, which issued on Aug. 6, 2019, each of which are herein incorporated in their entirety by reference.

TECHNICAL FIELD

The present invention relates to the field of light fixtures, and, more particularly, to a light board mounting system for a light fixture and related methods.

BACKGROUND

The fluorescent light bulbs are used in many commercial applications, particularly for indoor office lighting. The fluorescent light fixtures include a troffer with one or more fluorescent light bulbs, where the fluorescent light bulbs have different sizes. For example, common fluorescent lights for use in indoor lighting include the T5 (⅝ inch diameter), T8 (1 inch diameter), and the T12 (1½ inch diameter). Such fluorescent bulbs are relatively inefficient and have a relatively short life. Thus, efforts have been made to identify suitable alternative illumination sources for indoor office lighting applications. Light emitting diodes ("LEDs") have been identified as one alternative to traditional fluorescent bulbs.

An LED typically includes a diode mounted onto a die or chip. The die is connected to a power source, which, in turn, transmits power to the diode. An LED used for lighting or illumination converts electrical energy to light in a manner that results in little radiant energy outside the visible spectrum.

Efforts have also been made to retrofit fluorescent light fixtures with an LED light fixtures. However, the heat generated by the LED light fixtures may cause problems related to the functions of the LEDs and light fixtures. In particular, the relatively high operating temperatures may degrade the performance of the LED light. For example, typical LED lights have a lifetime of approximately 50,000 hours at room temperature, but can be reduced significantly at higher operating temperatures. Thus, many retrofit LED light fixtures do not provide the anticipated benefits or longer life due to inadequate thermal ventilation and configuration. Therefore, there exists a need for an LED mounting system for a light fixture that is easy to install and includes adequate heat dissipation.

SUMMARY

In view of the foregoing background, it is therefore an object of the present invention to provide an improved LED mounting system for light fixtures.

This and other objects, features, and advantages in accordance with the present invention are provided by an LED board mounting system having a fixture frame with a planar surface, a plurality of alternating bosses disposed along a length of the planar surface of the fixture frame, and at least one LED board having a first side and a second side. In addition, a plurality of LEDs are disposed along a length of the at least one LED board on the first side, and a pair of electrical contacts are coupled to the plurality of LEDs and mounted to the second side of the at least one LED board and extending away from the second side. In addition, a first edge and an opposing second edge of the at least one LED board is secured to the planar surface of the fixture frame between the plurality of alternating bosses, where the second side of the at least one LED board being adjacent to the planar surface of the fixture frame and the pair of electrical contacts extend through the planar surface.

A method aspect is directed to a method of mounting an LED board to a fixture frame, where the LED board has a plurality of LEDs mounted thereon and a pair of electrical contacts connected thereto. The method includes punching a hole through the planar surface of the fixture frame to form alternating bosses on a first side of the fixture frame. The method also includes aligning a first edge and opposing second edge of the LED board between the plurality of alternating bosses, where the LED board is adjacent to the first side of the planar surface of the fixture frame. In addition, the method includes securing the LED board to the fixture frame, where the pair of electrical contacts extend through the planar surface.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
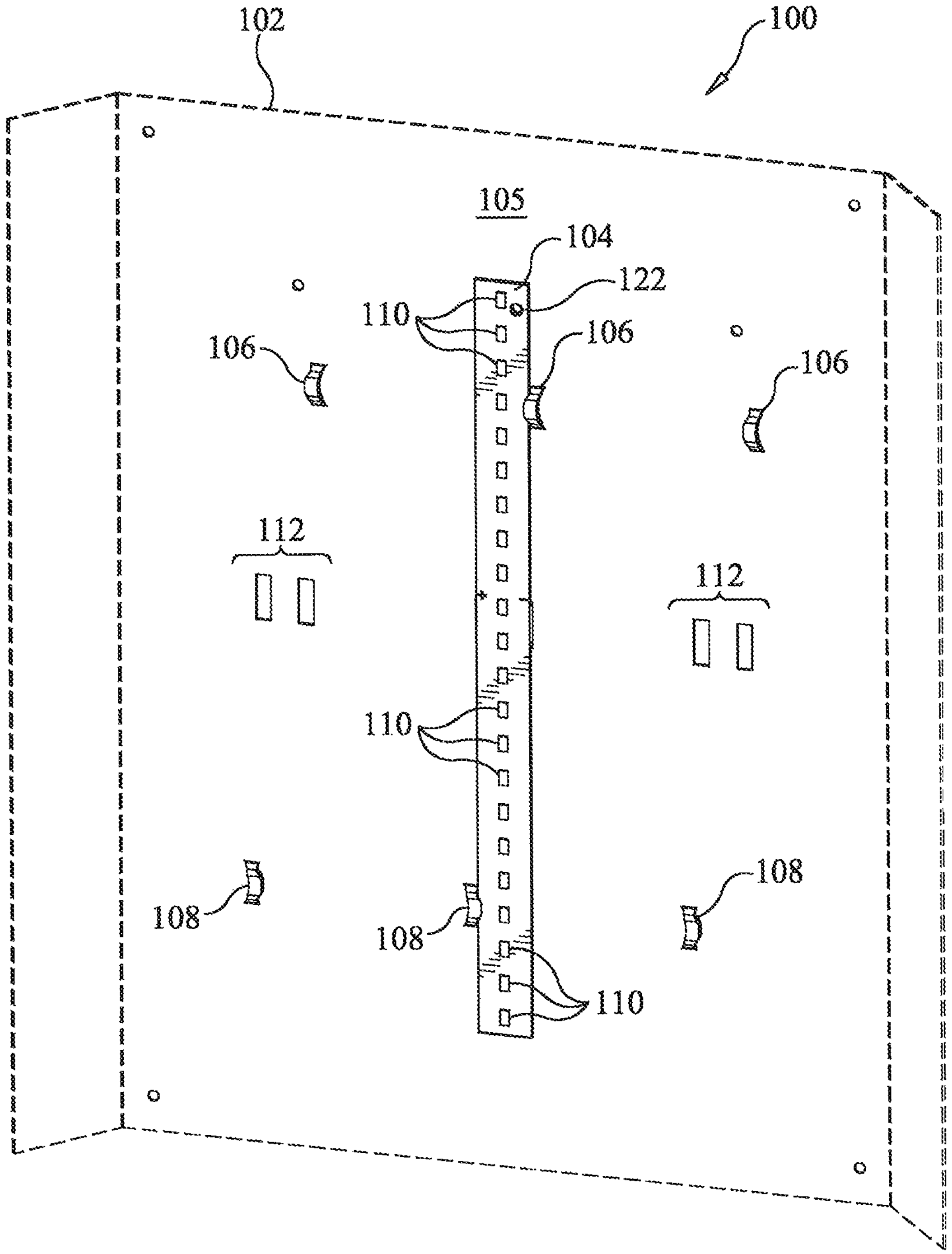
FIG. 1 is a front perspective view of a LED board mounting system for a light fixture.
Figure 2:
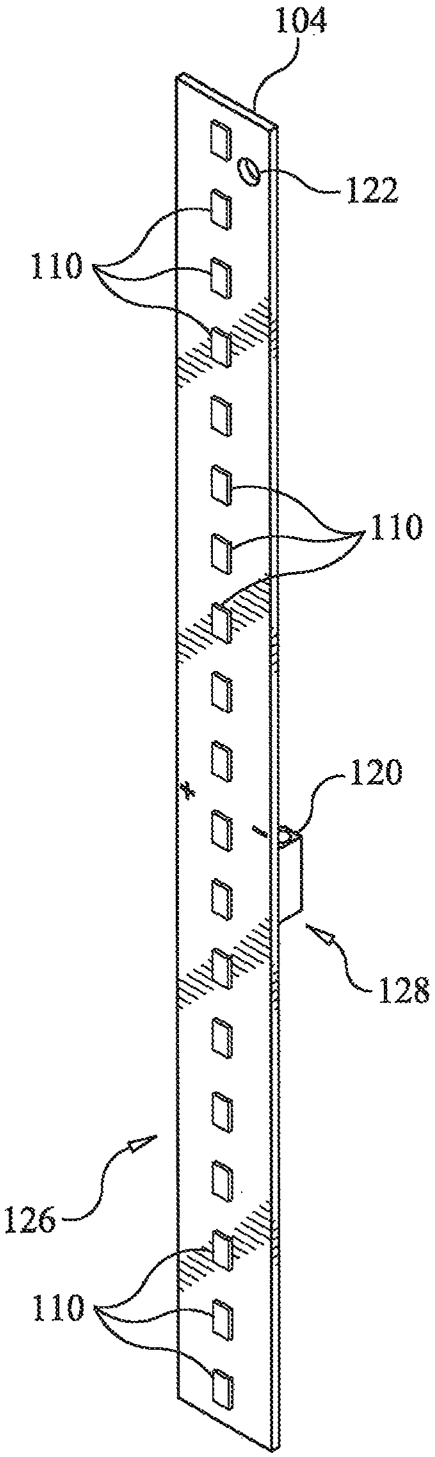
FIG. 2 is a front perspective view of an LED board in accordance with an embodiment of the invention.
Figure 3:
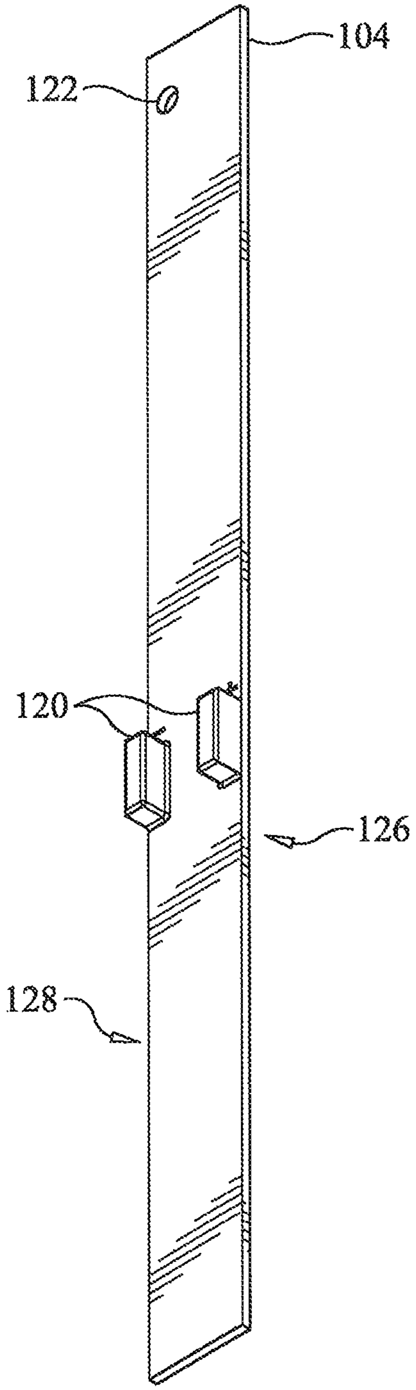
FIG. 3 is a rear perspective view of the LED board.

Referring initially to FIGS. 1-3, an embodiment of the LED board mounting system 100 for a light fixture 102 in accordance with features of the present invention will be described. The LED board mounting system 100 includes a fixture frame 102 having a planar surface 105. A plurality of alternating bosses 106, 108 are disposed along a length of the planar surface 105 of the fixture frame 102. An LED board 104 is shown mounted to the fixture frame 102 and having a plurality of LEDs 110 disposed along a length of the LED board 104 on a first side. The LEDs 110 are longitudinally aligned along the LED board 104 in a particular embodiment.

A pair of electrical contacts 120 on a second side of the LED board 104 are coupled to the plurality of LEDs 110. A first edge 126 and opposing second edge 128 of the LED board 104 is secured to the planar surface 105 of the fixture frame 105 between the plurality of alternating bosses 106, 108. As shown in FIG. 1, the second side of the LED board 104 is adjacent to the planar surface 105 of the fixture frame 102 and having the pair of electrical contacts 120 extending through matching apertures 112 formed in the planar surface 105. The electrical contacts 120 are configured to be connected to a power source in order to power the LEDs 110.

Figure 4:
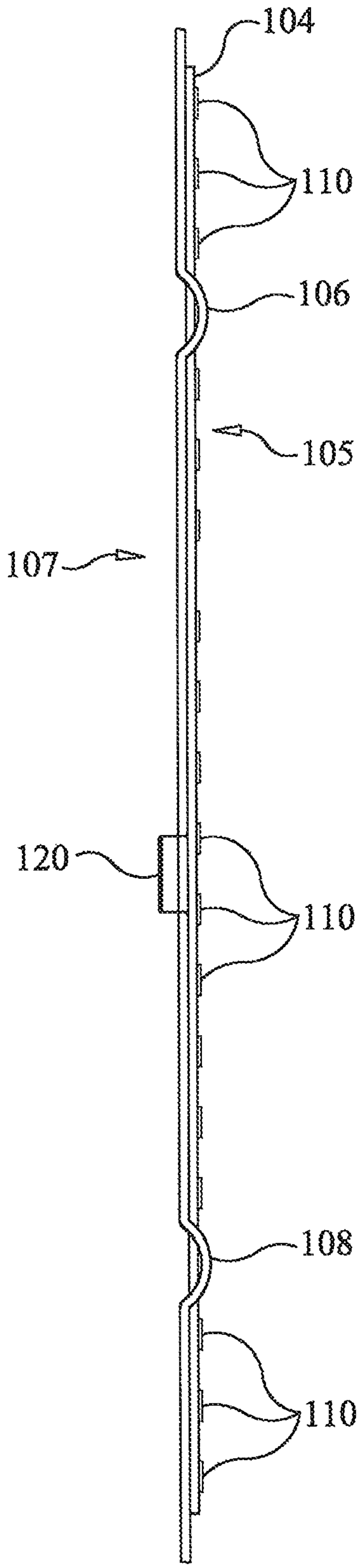
FIG. 4 is an elevational view taken in the direction of line 4-4 of FIG. 1.

Referring now to FIG. 4, the alternating bosses 106, 108 can be seen protruding from the underside 107 of the planar surface 105 in the form of a band that is formed by punching through the planar surface 105. The bosses 106, 108 are orientated to alternate from one edge of the LED board 104 to the opposing second edge 108 in order to secure the LED board 104 to the planar surface 105. The bosses 106, 108 are formed from the planar surface 105 using a punching device.

Figure 5:
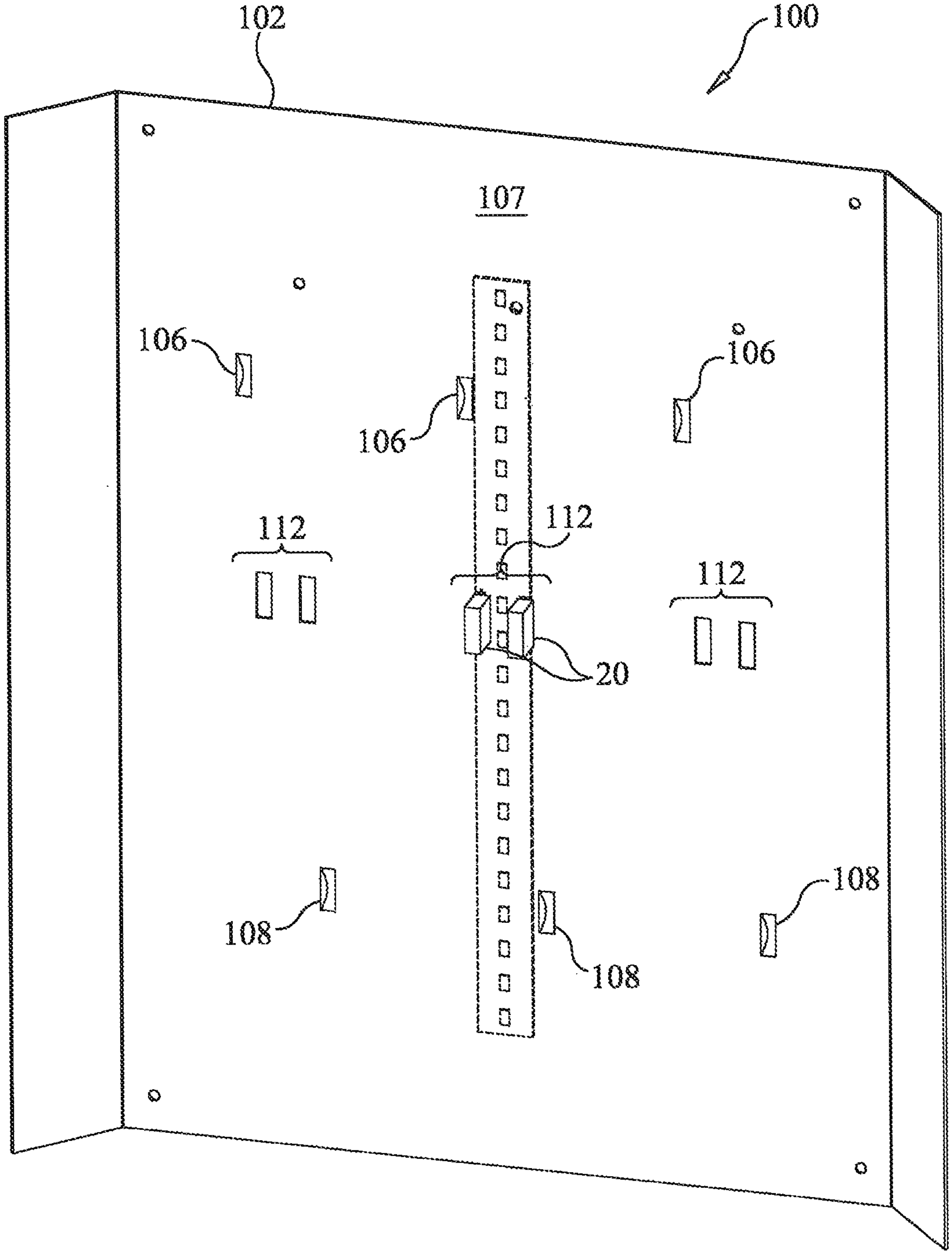
FIG. 5 is a rear perspective view of the LED board mounting system shown in FIG. 1.

FIG. 5 is a rear view of the LED mounting system 100 and, in particular, shows the underside of the fixture frame 102. As described above, the electrical contacts 120 are slid through the apertures 120 to the rear of the fixture frame 102. The electrical connection to a power supply and to other additional LED boards can be made at the underside of the fixture frame 102. The top side of the fixture frame 102 is orientated so that when installed, the light generated from the LEDs 110 produces visible light for the user as in a typical office environment.

Figure 6:
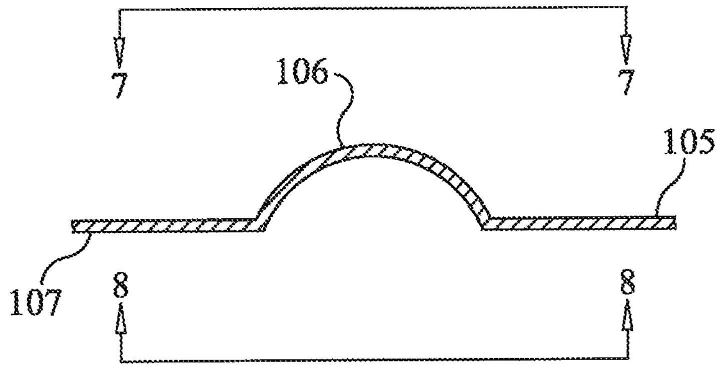
FIG. 6 is an elevational view of a boss formed in a planar surface of the light fixture taken in the direction of line 6-6 of FIG. 5.
Figure 7:
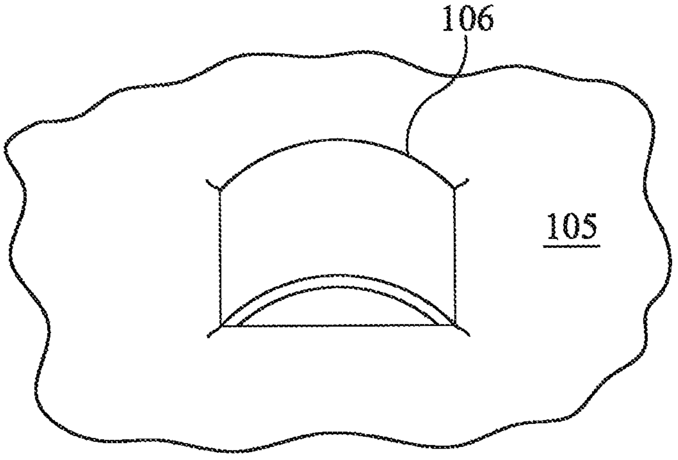
FIG. 7 is a top view of the boss shown in FIG. 6 taken in the direction of line 7-7 of FIG. 6.
Figure 8:
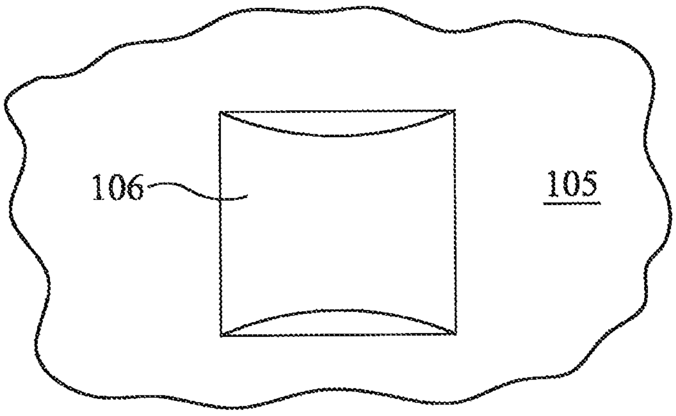
FIG. 8 is a bottom view of the boss taken in the direction of line 8-8 of FIG. 6.

More detailed views of the boss 106 is shown in FIGS. 6-8. As described above, the fixture frame 102 includes a topside planar surface 105 and a bottom side planar surface 107. A mechanical punch is used to force a portion of the planar surface 105 upwards and away to form a generally curved, or band, portion (i.e., the boss 106) that protrudes above the planar surface 105. A top view of the boss 106 shown in FIG. 7 shows that the boss 106 has a generally rectangular shape. When viewing the boss 106 from the bottom through the planar surface 107, there is a rectangular hole with the boss 106 spanning over the hole.

Figure 9:
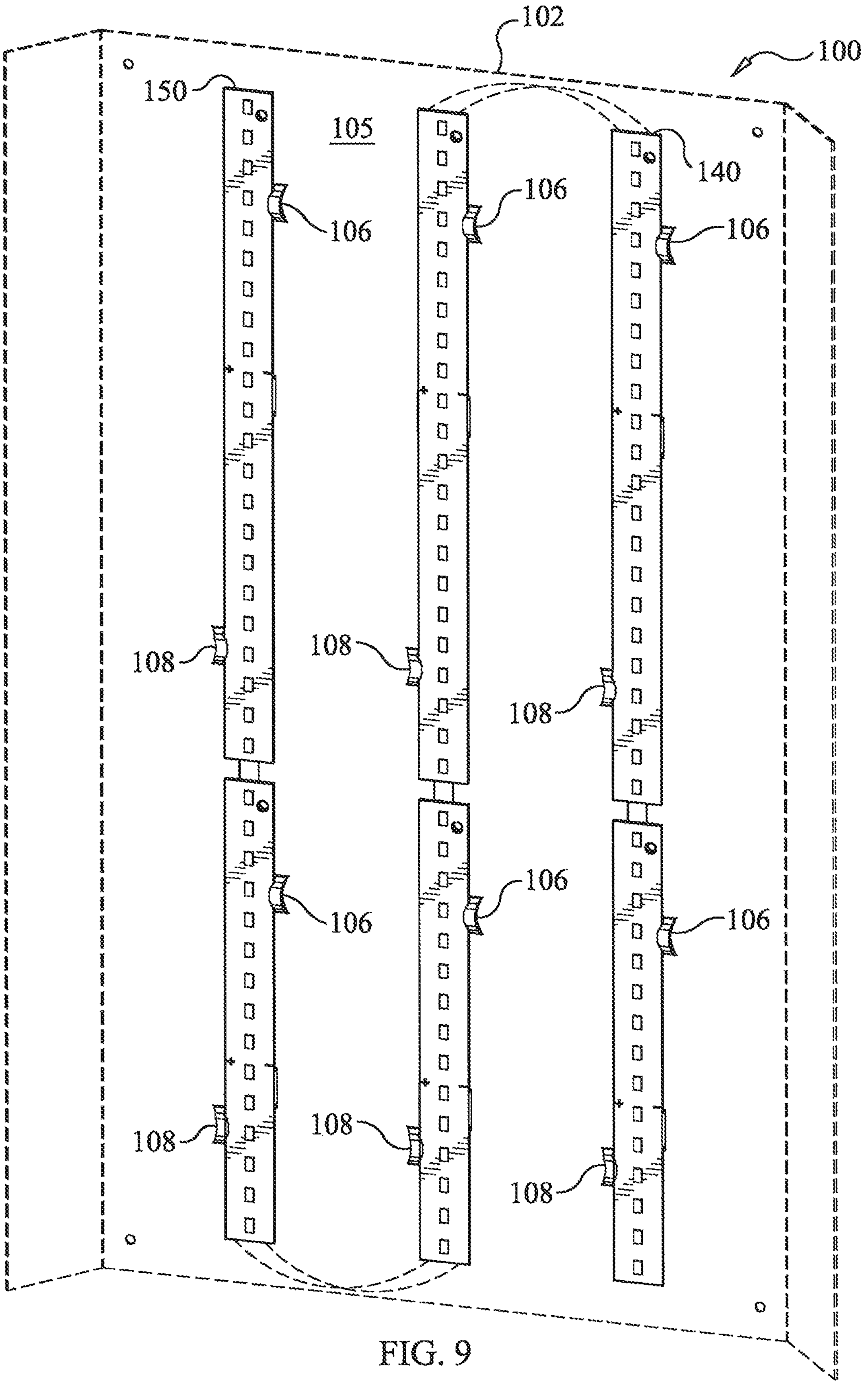
FIG. 9 is front perspective view of an embodiment of the LED board mounting system having a plurality of LED boards.

Referring now to FIG. 9, a plurality of LED board 104 are shown mounted to the fixture frame 102. In particular, the LED boards 104 are mounted in three columns, and being orientated in parallel with each other. In addition, LED boards 104 are shown in linear orientation with each other, so that there are two LED boards 104 in each column, and there are three columns of LED boards 104. The LED boards 104 are electrically connected together and to a power source.

A method of mounting the LED boards 104 to the fixture frame 102 includes punching a hole through the planar surface 105 of the fixture frame 102 to form the alternating bosses 106, 108 on a first side (i.e. topside) of the fixture frame 102. Then, a first edge and opposing second edge of the LED board is aligned between the plurality of alternating bosses 106, 108, where the LED board 104 is mounted adjacent to the first side of the planar surface 105 of the fixture frame 102. Each of The LED boards 104 can be secured to the fixture frame 102, with the pair of electrical contacts 120 extending through the planar surface 105. As described above, the bosses 106, 108 may be formed by a punching process, or other mechanical device that forms the bosses 106, 108 directly from the material of the fixture frame. The material of the fixture frame is metal in a particular illustrative embodiment.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A light board mounting system, the system comprising:
- a fixture having a planar surface;
- a plurality of alternating bosses disposed along a length of the planar surface of the fixture, each alternating boss comprising a curved portion formed from a raised portion of the planar surface and including a band having a first and end and a second end;
- at least one light board having a first side and a second side;
- a plurality of lights disposed along a length of the at least one light board on the first side; and
- a first edge and opposing second edge of the at least one light board secured to the planar surface of the fixture between, and in contact with, respective innermost edge surfaces of the plurality of alternating bosses, the first edge and opposing second edge of the light board defining a board width between them, the second side of the at least one light board being adjacent to the planar surface of the fixture,
- wherein the plurality of alternating bosses do not overlap an orthogonal plan view of the first side, and
- wherein the planar surface includes a hole associated with each of the respective plurality of alternating bosses and the respective band spans over the respective hole such that each of the first end and the second end connect to the planar surface between the respective innermost edge surfaces and respective outer most edge surfaces of the plurality of alternating bosses, the first end and the second end connect to the planar surface at respective first and second ends, the first and second ends being orthogonal to the respective innermost edge surfaces.

2. The system of claim 1, wherein the planar surface includes a hole associated with each of the respective plurality of alternating bosses and the plurality of alternating bosses span over the respective hole.

3. The system of claim 2, wherein the system includes an additional light board longitudinally aligned with the at least one light board on the planar surface of the fixture.

4. The system of claim 3, wherein the additional light board is secured spaced apart relation and in parallel orientation to the at least one light board.

5. The system of claim 3, wherein the additional light board and the at least one light board are electrically connected.

6. The system of claim 2, wherein the hole is a rectangular hole.

7. The system of claim 1, wherein the plurality of alternating bosses are formed from a punched portion of the planar surface of the fixture.

8. The system of claim 1, wherein the curved portion includes a band.

9. The system of claim 8, wherein the curved portion extends above the planar surface and the innermost edge surfaces of the plurality of alternating bosses are adjacent to the curved portion.

10. The system of claim 1, wherein the plurality of lights are arranged in a substantially linear orientation on the first side of the at least one light board.

11. The system of claim 1, wherein the at least one light board comprises a dielectric substrate carrying the lights.

12. A method of mounting a light board to a fixture, the light board having a plurality of lights mounted thereon, the method comprising:

forming a plurality of alternating bosses on a first side of the fixture, wherein the plurality of alternating bosses include a curved portion and are formed from the planar surface and include a band having a first and end and a second end;

aligning a first edge and an opposing second edge of the light board between the plurality of alternating bosses, the first edge and opposing second edge of the light board defining a board width between them, wherein the light board is adjacent to the first side of the planar surface of the fixture; and securing the light board to the fixture between, and in contact with, respective innermost edge surfaces of the plurality of alternating bosses, wherein a lateral offset distance between the respective innermost edge surfaces is substantially equal to the board width and wherein the plurality of alternating bosses do not overlap an orthogonal plan view of the first side, and wherein the planar surface includes a hole associated with each of the respective plurality of alternating bosses and the respective band spans over the respective hole such that each of the first end and the second end connect to the planar surface between the respective innermost edge surfaces and respective outer most edge surfaces of the plurality of alternating bosses, the first end and the second end connect to the planar surface at respective first and second ends, the first and second ends being orthogonal to the respective innermost edge surfaces.

13. The method of claim 12, wherein forming the plurality of alternating bosses includes forming a hole in the planar surface associated with each of the respective plurality of alternating bosses.

14. The method of claim 13, wherein the plurality of alternating bosses span over the respective hole.

15. The method claim 13, wherein the hole is a rectangular hole.

16. The method claim 13, wherein forming the plurality of alternating bosses comprises punching a portion of the planar surface of the fixture.

17. The method claim 12, wherein the curved portion includes a band.

18. The method of claim 17, wherein the curved portion extends above the planar surface and the innermost edge surfaces of the plurality of alternating bosses are adjacent to the respective curved portions.

19. The method of claim 12, further comprising securing an additional light board to the planar surface wherein the additional light board is longitudinally aligned with the at least one light board on the planar surface of the fixture.

20. The method of claim 12, further comprising extending a pair of electrical contacts through the planar surface.

21. A light board mounting system, the system comprising:

a fixture having a planar surface;

a plurality of alternating bosses disposed along a length of the planar surface of the fixture, each alternating boss comprising a curved portion formed from a raised portion of the planar surface and including a band having a first and end and a second end;

at least one light board having a first side and a second side;

a plurality of lights disposed along a length of the at least one light board on the first side; and a first edge and opposing second edge of the at least one light board secured to the planar surface of the fixture between, and in contact with, respective innermost edge surfaces of the plurality of alternating bosses, the first edge and opposing second edge of the light board defining a board width between them, the second side of the at least one light board being adjacent to the planar surface of the fixture, wherein the plurality of alternating bosses do not overlap an orthogonal plan view of the first side, wherein the planar surface includes a hole associated with each of the respective plurality of alternating bosses and the respective band spans over the respective hole such that each of the first end and the second end connect to the planar surface between the respective innermost edge surfaces and respective outer most edge surfaces of the plurality of alternating bosses, the first end and the second end connect to the planar surface at respective first and second ends, the first and second ends being orthogonal to the respective innermost edge surfaces, and wherein the LED boards further comprise a pair of electrical contacts and the at least one light board is secured to the frame with the pair of electrical contacts extending through the planar surface.

* * * * *